(12) United States Patent
Novakov

(10) Patent No.: US 6,571,103 B1
(45) Date of Patent: May 27, 2003

(54) ESTABLISHING A COMMUNICATION LINK

(75) Inventor: Emil P Novakov, Munich (DE)

(73) Assignee: Agere Systems Inc., Allentown, PA (US)

(*) Notice: Subject to any disclaimer, the term of this patent is extended or adjusted under 35 U.S.C. 154(b) by 0 days.

(21) Appl. No.: 09/567,423

(22) Filed: May 9, 2000

(30) Foreign Application Priority Data

May 12, 1999 (EP) .............................................. 99303689

(51) Int. Cl.[7] ................................................. H04Q 7/20
(52) U.S. Cl. ........................ 455/464; 455/434; 455/574; 455/343
(58) Field of Search ................................ 455/410, 411, 455/417, 422, 425, 426, 433, 434, 435, 436, 437, 448, 450, 455, 464, 509, 512, 513, 516, 550, 552, 553, 554, 556, 561, 574, 575, 343

(56) References Cited

U.S. PATENT DOCUMENTS

| 5,488,649 A | * | 1/1996 | Schellinger ................... 379/62 |
| 5,675,629 A | * | 10/1997 | Raffel et al. ................... 379/58 |
| 5,818,871 A |   | 10/1998 | Blakeney, II et al. ........ 375/220 |
| 5,852,631 A |   | 12/1998 | Scott ............................ 375/222 |
| 5,870,673 A | * | 2/1999 | Haartsen ...................... 455/426 |
| 5,995,842 A | * | 11/1999 | Jonsson ....................... 455/462 |
| 6,128,504 A | * | 10/2000 | Ciccone ....................... 455/464 |

FOREIGN PATENT DOCUMENTS

EP 0 877 513 A1 5/1998 ........... H04L/12/56

* cited by examiner

Primary Examiner—Thanh Cong Le
Assistant Examiner—James D Ewart

(57) ABSTRACT

A method for establishing a communication link between a telecommunications network and a mobile station via a local station connected to said telecommunications network and a short range radio channel between said local station and said mobile station comprises a step in which at least one property of said radio channel is negotiated between said local station and said mobile station, a step in which said mobile station enters a power saving mode, a step in which said mobile station enters an active mode, and a step in which said local station links said mobile station to said telecommunications network via said radio channel using said at least one negotiated property. A local station and a mobile station have corresponding features. The invention is especially adapted for portable telephone and data transmission devices.

26 Claims, 4 Drawing Sheets

ESTABLISHING A COMMUNICATION LINK

FIELD OF THE INVENTION

The present invention concerns the field of communication devices and in particular the field of digital voice and data communication systems. The invention is especially suited for use in wireless telephone devices such as cordless (short range) and mobile (cellular, wide range) telephones.

BACKGROUND OF THE RELATED ART

A recent development in the field of digital communication technology is the introduction of inexpensive, short range radio links. Especially the Bluetooth system offers a low power radio communication link for the transmission of both voice and data. Bluetooth is a universal radio interface in the unlicensed ISM frequency band (2.45 GHz) that enables portable electronic devices to connect and communicate via ad hoc networks. A frequency hop, time division duplex (FH/TDD) scheme is used to reduce the effects of possible interference from other radio sources. The transmission properties of each channel can be adjusted in a number of ways. This includes different data rates, error correction methods, and link protocols. Furthermore, different data packet protocols and voice encoding schemes may be selected.

Further information about the Bluetooth system can be found in the article "BLUETOOTH—The universal radio interface for ad hoc, wireless connectivity" by Jaap Haartsen, Ericsson Review No. 3, 1998, pages 110–117 and at the Internet site http://www.bluetooth.com. The Bluetooth draft standard and the underlying IEEE specification P802.11/D10: "Wireless LAN Medium Access Control (MAC) and Physical Layer (PHY) Specifications" provide detailed information about all features of the Bluetooth system. These documents are incorporated into the present specification in their entirety.

On page 112 of the article by Jaap Haartsen cited above, a "three-in-one phone" is mentioned as a possible user scenario of the Bluetooth system. This telephone may function as an intercom at the office (no telephony charge), as a cordless phone at home (fixed-line charge), and as a mobile phone otherwise (cellular charge). No technical information is given as to the way in which this functionality may be achieved.

A plurality of problems arise when the Bluetooth technology is used to build portable telephone and data transmission devices. These problems include achieving low power consumption of the mobile station, achieving quick response times when calls or data transmissions are originated, and negotiating appropriate properties of the Bluetooth transmission channel.

Technical Report TR 101 176 V1.1.1. of the European Telecommunications Standards Institute (ETSI) titled "Digital Enhanced Cordless Telecommunications (DECT); Global System for Mobile communications (GSM); Advanced integration of DECT/GSM dual-mode terminal equipment" teaches an integration of the two systems GSM and DECT. This solution is difficult because essentially two different terminals have to be integrated into one device. A DECT/GSM dual-mode terminal is also bound to be expensive since a DECT terminal costs about as much as a GSM mobile.

It is an object of the present invention to avoid at least some of these problems and to provide a way of establishing a communication link between a telecommunications network and a mobile station that is especially adapted for portable telephone and data transmission devices. Preferably, the whole system should also be flexible and easy to use as well as easy to implement with no or little hardware expense.

SUMMARY OF THE INVENTION

This objective is achieved by a method and devices having the features of the independent claims. The dependent claims define preferred embodiments of the present invention.

The invention is based on the idea to execute, before a call indication is received from the telecommunications network, a preliminary step in which at least one property of the short range radio channel is negotiated. The mobile station then enters a power saving mode. When the actual call indication arrives, the mobile station is activated and linked to the telecommunications network using the at least one negotiated channel property.

The invention provides several advantages. Since the mobile station enters the power saving mode after the preliminary step discussed above, low average power consumption and long battery life is achieved. Furthermore, the preliminary negotiation step may be rather time consuming, especially if it includes a further step of identifying available mobile stations. Since this step, according to the invention, is performed before the actual call indication arrives, the response time from arrival of the call indication to establishment of the communication link is shortened considerably. This is very convenient in the case of telephone (voice) connections and may be indispensable for the exchange of data packets. Furthermore, there is enough time for the preliminary negotiation step to find an optimal set of channel parameters. This may include time consuming operations, for example determining an optimal transmission power level depending on the level of noise signals in the environment.

In the terminology used here, a "property of the radio channel" may be any property or setting that affects the communication process via the channel. This includes properties of the transceivers of the local and mobile stations as well as properties of the method used in controlling said transceivers. The term "negotiating" includes all kinds of communication processes, for example any request/response process having one or more steps as well as any issuing of one or more commands for setting one or more channel properties concurrently or sequentially.

In preferred embodiments of the invention, a property of the radio channel that may be negotiated is the transmission power level of one or both radio transceivers in the local and/or the mobile stations. This property may be used to determine the range or area for the short range radio channel. The short range radio channel may have a maximum range of 500 m or 200 m or 100 m or 50 m or less in some embodiments. of the invention. Other variable properties of the channel are the voice transmission quality and/or protocol, the data transmission rate and/or protocol, and the error correction and/or recovery method. The possible settings of the channel may be according to a single standard or a combination of standards. For example, a GSM voice transmission method may be used in the context of a Bluetooth short range radio link.

Further properties of the local station and/or the mobile station may be negotiated in preferred embodiments. For example, a possible property of the local station is the priority of the local and mobile stations with respect to the signaling of incoming call indications.

Preferably the invention also provides a procedure for the mobile station to initiate an outgoing communication. This procedure may comprise the step of trying to contact the local station, and if this fails, using a further radio channel for establishing the communication link. The further radio channel preferably may be a long range and/or cellular radio channel, in particular a GSM channel.

The invention can be used with all kinds of short range radio channels having at least one adjustable property. In preferred embodiments, the short range radio channel is a digital channel and/or employs frequency hopping and/or time division multiplexing. In preferred embodiments, the short range radio channel is a point-to-point channel in a non-cellular environment. The short range radio channel may use a spread spectrum transmission method, which preferably includes channel hopping at a high hopping frequency (preferably above 500 hops/second or above 1000 hops/second or about 1600 hops/second). It is preferred to use a channel according to the Bluetooth standard mentioned initially as the short range radio channel. It is further preferred that the telecommunication network is a wire-based public or local network.

A mobile station according to a preferred embodiment of the invention is a GSM handset having an additional Bluetooth radio transceiver.

BRIEF DESCRIPTION OF THE DRAWINGS

A sample embodiment of the invention and several alternative embodiments will now be described in detail. Reference is made to the schematic drawings, in which.

DETAILED DESCRIPTION

Figure 1:
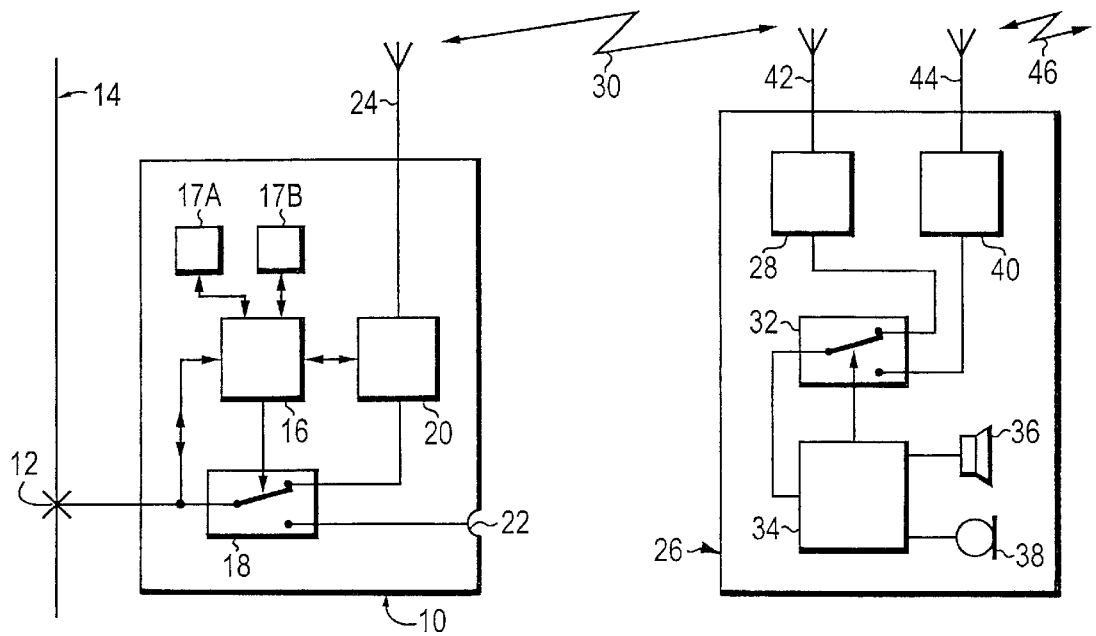
FIG. 1 is a block diagram of the system of the present invention including a local station and a mobile station.

Referring to the block diagram of FIG. 1, a local station (LS) 10 is connected to an access point (AP) 12 of a wireline public switched telephone network (PSTN) 14. The local station 10 comprises a controller and baseband module 16 connected to the access point 12 and to a display 17A and a keyboard or keypad 17B. The display 17A and the keyboard or keypad 17B are used for programming the local station 10 and the whole system.

The controller and baseband module 16 further controls an electronic switch 18 and a Bluetooth transceiver 20. The switch 18 connects the access point 12 either to the Bluetooth transceiver 20 or to a socket 22. A standard, wireline telephone apparatus or another device (for example, a modem) may be plugged into the socket 22. An antenna 24 is connected to the Bluetooth transceiver 20 for sending and receiving radio signals.

A mobile station 26 is also equipped with a Bluetooth transceiver 28 for establishing a short range radio channel 30 between the mobile station 26 and the local station 10 using the Bluetooth standard. The mobile station 26 further comprises an electronic switch 32 controlled by a controller and baseband module 34. A speaker 36 and a microphone 38 are connected to the controller and baseband module 34.

The switch 32 connects the controller and baseband module 34 either to the Bluetooth transceiver 28 or to a GSM radio unit 40. Two antennas 42, 44 are provided for the Bluetooth transceiver 28 and the GSM radio unit 40, respectively. The GSM radio unit 40 is used to establish a long range, cellular radio channel 46 according to the GSM standard.

In the present sample embodiment, the mobile station 26 is actually a GSM mobile telephone. The controller and baseband module 34 and the GSM radio unit 40 perform all functions required for the standard GSM telephone operating mode. These functions and the necessary hardware are well known and are not the subject of the present invention. The additional Bluetooth transceiver 28 is not only used for implementing the present invention, but also to communicate all kinds of data (address lists, personal phone books, SMS messages, etc.) to other devices like hand held organizers or personal computers. Based on this hardware, the further functionality provided by the present invention can be accomplished in the mobile station 26 by software only, without any need for additional hardware.

The mobile station 26 of the present sample embodiment supports both voice and data communication. As mentioned above, the mobile station 26 acts as a mobile or cordless telephone in the voice transmission mode. In the data mode the mobile station may be used either in a standalone way (e.g., for accessing an e-mail server and displaying any received messages on a built-in display) or as a wireless modem. In the latter case, the mobile station 26 is connected to a personal computer or laptop via a serial cable interface (e.g., RS-232; not shown in FIG. 1).

Figure 2:
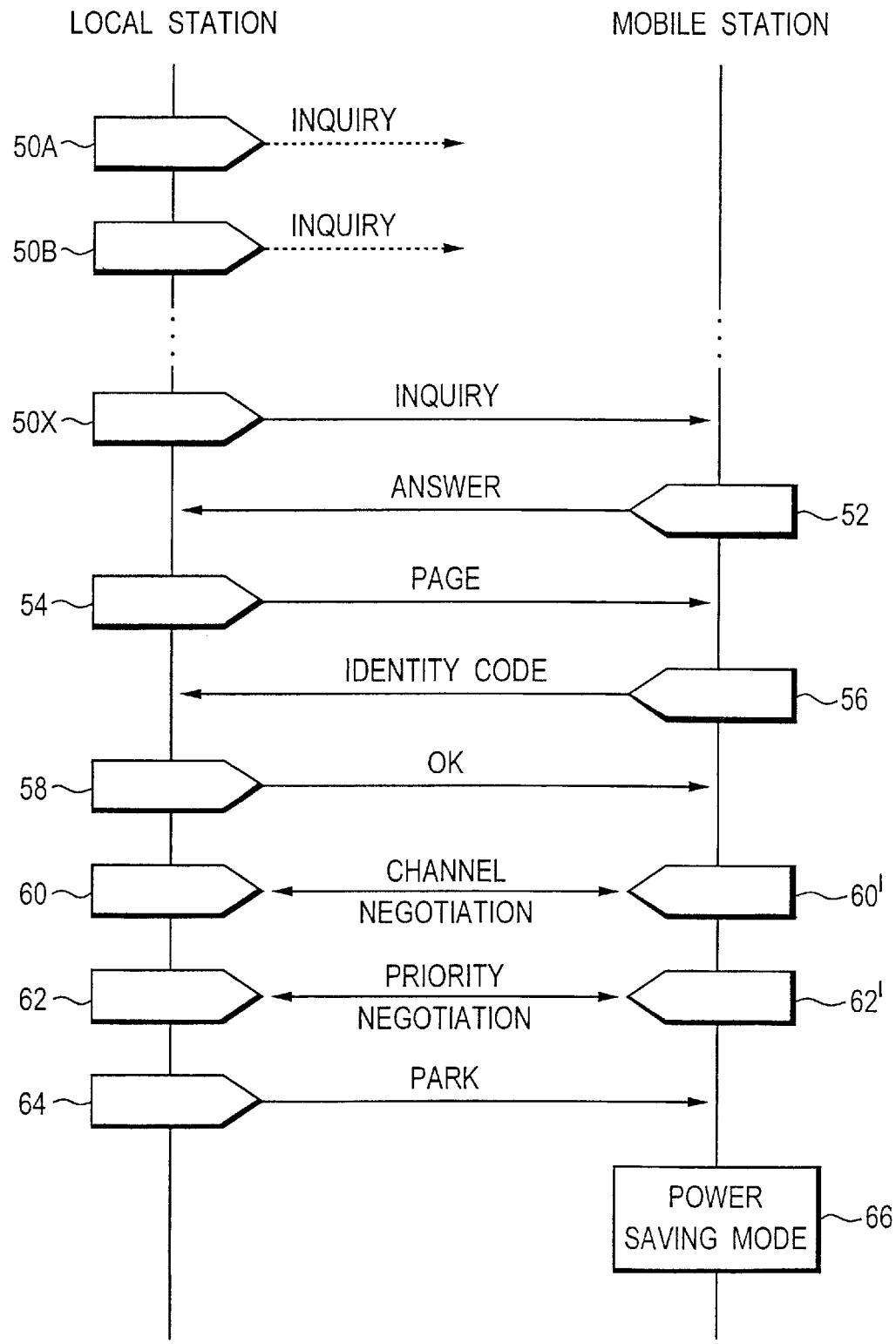
FIG. 2 is a time sequence chart of the preliminary step of preparing the establishment of the communication link before a call indication is received.

FIG. 2 shows the initial phases of the method of establishing a communication link according to the presently described sample embodiment. When the local station 10 starts operating, inquiry messages-are sent (steps 50A, 50B, . . . , 50X) in regular time intervals in order to find and identify any mobile station 26 within the range of the Bluetooth link. These inquiry messages contain an inquiry access code common to all Bluetooth devices and are sent on predefined inquiry wake-up carriers.

In the sample scenario of FIG. 2, no mobile station 26 is close enough to the local station 10 when the first few inquiries are sent (steps 50A, 50B). In this case the switch 18 in the local station 10 (FIG. 1) connects the access point 12 to the socket 22 (and to the device plugged into this socket).

We now assume that a mobile station 26 has been moved into the transmission range of the local station 10, and that the inquiry sent in step 5OX is the first one that reaches the mobile station 26. If the Bluetooth channel in the mobile station is enabled, the mobile station 26 then sends an answer message to the local station 10 in step 52. In response to this answer, the local station 10 pages the mobile station 26 (step 54) and receives an identity code, for example a telephone number of the mobile station 26 or other identification data (step 56). Acknowledgement of this identity code (step 58) ends the initial sequence of steps. During these steps, the local station 10 also assigns a Media Access Control (MAC) address to the mobile station 26. This makes it possible to connect more than one mobile station 26 (in some embodiments up to eight mobile stations) to the local station 10. As a result of the steps described above, a piconet has been created between the local station 10 acting as a master and the mobile station 26 acting as a slave according to the Bluetooth standard.

The next steps 60, 60' concern the negotiation of channel properties. In the present sample embodiment the following properties of the short range radio channel 30 are adjustable:

1. Power level of transceivers 20 and 28

The power level may be set between values of −30 dBm (range of radio channel 30 about 10 cm) and +20 dBm (about 100 mW—range of radio channel 30 about 100 m). A typical value would be 0 dBm (about 1 mW—range of radio channel 30 about 10 m) if the system is to be used within the room or the apartment. A higher value can be selected if wider ranges (e.g., house and garden) are to be covered. Such higher power levels may even be above the maximum defined in the Bluetooth standard, if permitted by local rules. A lower value may be useful for crowded environments (e.g., in large offices) or for secrecy reasons.

2. Voice transmission quality and protocol

Since the mobile station 26 is a GSM mobile telephone in the present sample embodiment, voice encoding and transmission may be either according to the GSM or the Bluetooth standard (Bluetooth normally uses a continuous variable slope delta modulation). Furthermore, different transmission quality levels may be set.

3. Data transmission rate and protocol

When the mobile station 26 is used for data transmission (e.g., in mobile fax or mobile Internet applications), different types of Bluetooth data channels can be used. Symmetric and asymmetric data rates between 36.3 and 576.0 kbit/s are supported.

4. Error correction and/or recovery method

Data packets can be protected by forward error control or by backward error control schemes. In particular, an automatic request (ARQ) scheme may be used for automatically retransmitting lost packets.

In the present sample embodiment, the settings of the local station 10 and the mobile station 26 with respect to all four channel properties mentioned above are negotiated in steps 60, 60'. Additional or fewer or different properties may be used in alternative embodiments.

The present sample embodiment uses a very simple way of negotiation. The local station 10 determines suitable settings for each of the adjustable channel properties and sends corresponding setting commands to the mobile station 26 (step 60). These property settings are programmed into the Bluetooth transceiver 28 and the controller and baseband module 34 of the mobile station 26, and a confirmation message is returned to the local station 10 (step 60').

The negotiation process is more sophisticated in alternative embodiments. For example, some properties like the transmission power level may be set by the user at the mobile station 26, while other properties are determined by the local station 10. This means that both the local and the mobile stations 10, 26 may have the authority to issue setting commands. Furthermore, some kind of tests may be performed in order to determine suitable parameter values. Such a test may be, for example, sending test data to find out the actual transmission error rate with different power settings under the present environment conditions.

The negotiation process may also be designed to cope with different capabilities of the local and mobile stations 10, 26. For example, some mobile stations 26 may only offer a restricted range of transmission channel settings. In such situations the mobile station 26 may inform the local station 10 about the possible parameter values, such that the local station 10 will only select allowed values. It is also possible that the local station 10 successively tests different setting commands until it receives a positive confirmation from the mobile station 26.

Summing up, one of a plurality of channel settings is determined in steps 60, 60'. The resulting channel 30 may be an asynchronous connectionless (ACL) link or a synchronous connection oriented (SCO) link depending on the desired application.

FIG. 2 further shows steps 62, 62' in which the priority of the local station 10 and the mobile station 26 with respect to incoming call indications is negotiated. For the example of an incoming telephone call, the priority may be that only the mobile station 26 signals the call, or that only the device connected to socket 22 of the local station 20 signals the call, or that the call is signaled by both the mobile station 26 and the wire bound device.

In some embodiments of the invention, more than one mobile station 26 may be present in the piconet. In this case individual priorities may be assigned to each of the mobile stations. When the local station 10 receives a call, it will be directed to the mobile stations and the socket 22 in descending order of priority. In other words, the external call will first be directed to the mobile station (or the socket 22) with the highest priority. If this mobile station does not answer, the call will be redirected to the mobile station with the next lower priority (if it is present in the piconet). It is also possible to negotiate the priorities such that all mobile stations (or a group thereof) concurrently signal an incoming call.

Further properties of the local station 10 and/or the mobile station 26 and/or other devices may also be determined in these steps 62, 62'. The process of negotiation and the possible variations thereof are essentially the same as described above in connection with steps 60, 60'.

When all negotiation steps have been completed, the local station 10 sends a "park" message to the mobile station 26 (step 64). In response, the mobile station 26 enters a power saving mode in which battery life is maximized (box 66). This power saving mode is the Bluetooth PARK mode in the present sample embodiment, but it can also be the HOLD or the SNIFF mode in alternative embodiments. In the PARK mode the mobile station 26 is still synchronized to the piconet and occasionally listens to the traffic of the local station 10 to check on broadcast messages, but it does not actively participate in the traffic. Entering the power saving mode completes the preliminary phase in the method for establishing a communication link according to the present sample embodiment.

Figure 3:
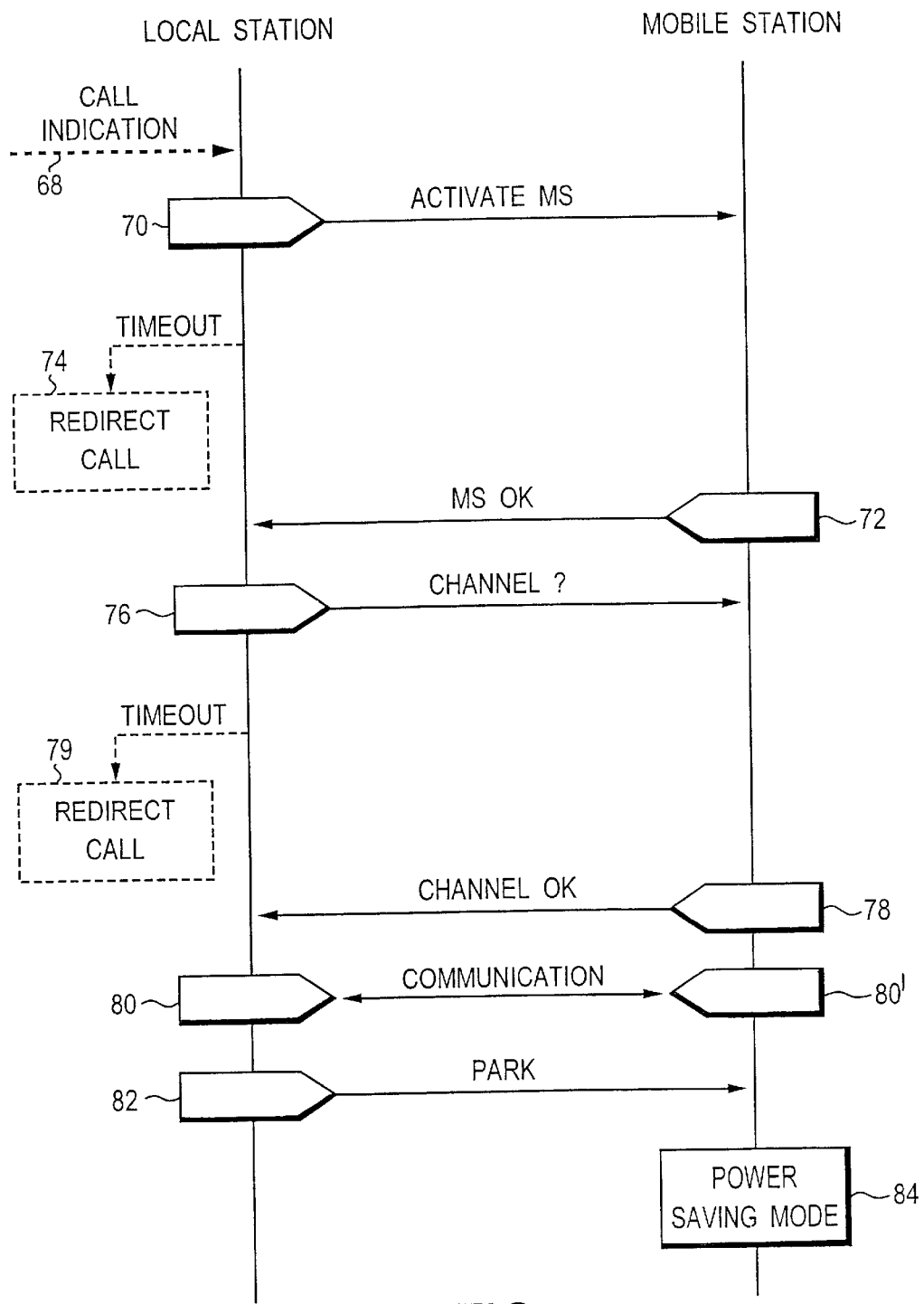
FIG. 3 is a time sequence chart of the steps of completing the establishment of the communication link after the call indication is received (local station originated call), and of further steps.

FIG. 3 shows the steps performed when a call indication is received by the local station 10. This call indication may be an incoming telephone call or another request for voice or data communication arriving from the telecommunications network 14. In other words, the situation of FIG. 3 is that of an externally originated call. The sample scenario in FIG. 3 assumes that the call priority has been negotiated in steps 62, 62' in a way that external calls are to be signaled by the mobile station 26. If the call shall only be routed to the device connected to socket 22, it is of course not necessary to perform any communications with the mobile station 26.

Upon receipt of the call indication (step 68), the local station 10 sends an activation code to the mobile station 26 (step 70). This activation or wake-up code causes the mobile station to end its power saving mode and to resume an active (working) mode of operation. The mobile station 26 also starts to signal the incoming call to the user, for example by emitting a ringing tone. Successful activation is acknowledged by an OK message of the mobile station 26 (step 72).

If the local station 10 does not receive the acknowledgement within a predetermined time interval, it is assumed that the mobile station 26 is unavailable. The reason may be that the mobile station 26 has been switched off or has been moved out of the range of the Bluetooth link. In this case a timeout occurs (step 74), which causes the call to be directed to the device connected to socket 22 of the local station 10 (or, as mentioned above, to a further mobile station with lower priority present in the piconet). Depending on the call priority and further settings, other measures may be taken in response to a timeout (e.g., increasing the radio power level, redirecting the call to another unit etc.).

If the local station 10 receives the acknowledgement in time, it generates a request to establish the Bluetooth channel 30 using the channel properties negotiated in steps 60, 60' (step 76). The mobile station 26 acknowledges this request by a channel OK message (step 78), and a sequence of communication steps 80, 80' ensues. These communication steps serve to link the mobile station 26 to the telecommunication network 14 via the local station 10 and the radio channel 30. Thus the communication link has been established.

The mobile station 26 will only send the channel OK message (step 78) if the call is actually accepted. In the case of an incoming telephone call, this requires that the user answers the call by pressing a button at the mobile station 26. Other types of messages (e.g., incoming telefax messages) may be received automatically by the mobile station 26. The local station 10 implements a further timeout mechanism to detect the case of non-acceptance of a call. This timeout occurs if the channel OK message (step 78) is not received within a predetermined time interval after the channel request in step 76. Similarly to the timeout processing in step 74, the call may be redirected to the device connected to socket 22 (step 79) or may be declined altogether.

After the end of the communication (steps 80, 80'), the local station 10 once more issues a "park" command (step 82). This causes the mobile station 26 to enter the power saving mode (box 84). The settings negotiated in steps 60, 60', 62, 62' are retained for further communication phases.

Figure 4:
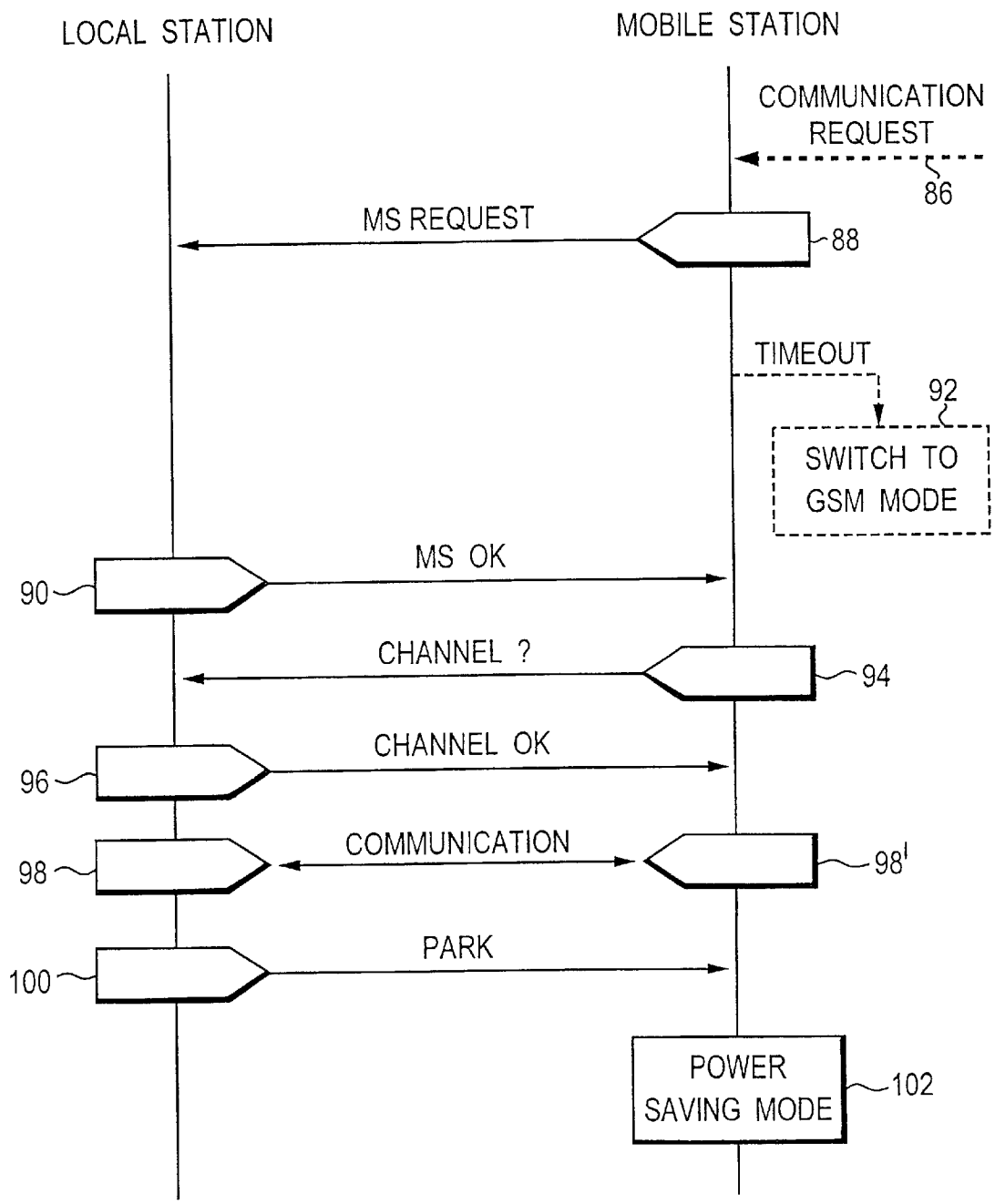
FIG. 4 is a time sequence chart of the steps of completing the establishment of the communication link after a communication request is received by the mobile station (mobile station originated call), and of further steps.

FIG. 4 shows the case of a call originating from the mobile station 26. The individual steps are similar to those shown in FIG. 3.

The process of FIG. 4 starts by the occurrence of a communication request generated by the user of the mobile station 26 (step 86). For example, the user may dial a telephone number or wish to send a telefax or e-mail message. As a precondition for this communication request, the mobile station 26 must first have been activated by the user.

The communication request is transmitted to the local station 10 in step 88, and the local station acknowledges receipt in step 90. If no acknowledgement is received by the mobile station 26 within a predetermined time interval, a timeout occurs and it is assumed that the local station 10 cannot be reached. The mobile station 26 will then switch to GSM mode (step 92) and satisfy the communication request of the user via a long range, cellular GSM channel. This ensures that the mobile station 26 can always be used irrespective of its physical proximity to the local station 10.

If no timeout occurs, the radio channel 30 is set up (steps 94, 96) using the properties determined in steps 60, 60', 62, 62'. The communication link between the telecommunication network 14 and the mobile station 26 has thus been established, and a sequence of communication steps ensues (steps 98, 98'). After termination of the communication link, the mobile station 26 is once more switched into the power saving mode by a "park" command from the local station 10 (step 100, box 102).

Generally and in all modes of operation, the local station 10 will detect that the mobile station 26 has moved out of the area covered by the Bluetooth link if a request sent to the mobile station 26 is not answered in time. The mobile station 26 may also send an explicit information to the local station 10 that it is no longer available. This happens if the mobile station 26 is switched off by the user. In both cases the local station 10 will take appropriate steps to redirect any incoming calls. Furthermore, the mobile station 26 can always be used as an independent GSM terminal.

Figure 5:
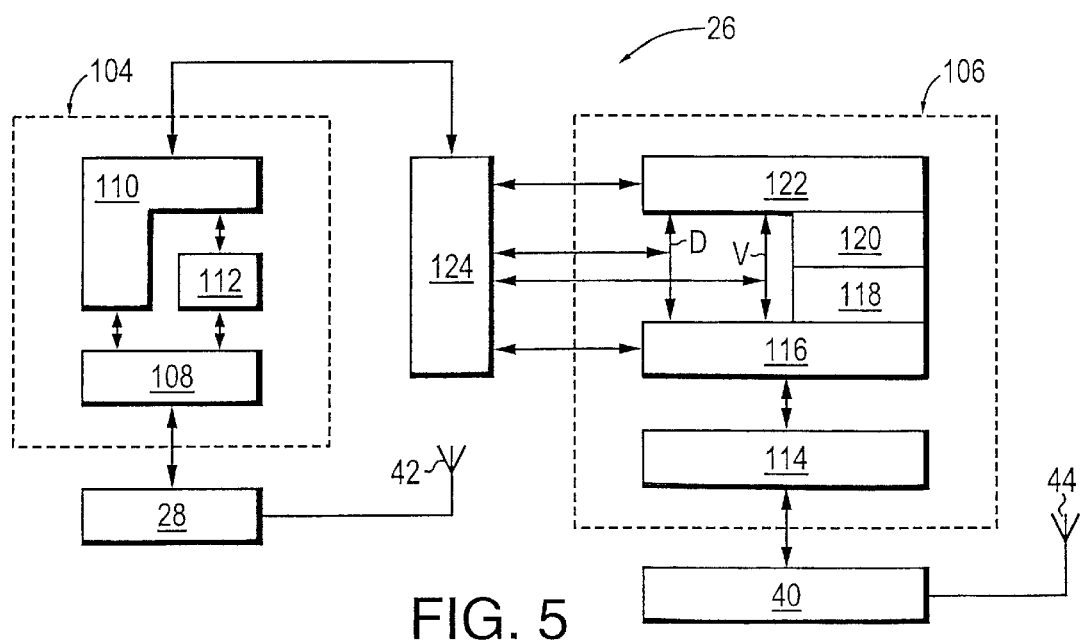
FIG. 5 is a block diagram showing the software structure used in the mobile station of FIG. 1.

FIG. 5 schematically depicts the structure of the software implemented in the mobile station 26. This software includes both a Bluetooth protocol stack 104 and a GSM protocol stack 106. Both protocol stacks 104, 106 are well known per se. The Bluetooth protocol stack 104 includes a Bluetooth baseband module 108 interfacing with the Bluetooth transceiver 28 and a Bluetooth host controller interface 110 implementing a Bluetooth line management protocol 112. The GSM protocol stack includes a plurality of hardware drivers 114 interfacing with GSM protocol layers 1, 2 and 3 (reference numerals 116, 118, 120). A user interface module 122 is connected to GSM protocol layer 3. Reference signs D and V represent the data and the voice channels, respectively.

The present invention provides a protocol adapter 124. The protocol adapter 124 is implemented as a software module and communicates with the Bluetooth host controller interface 110, the user interface 122, the GSM protocol layer 1 (reference numeral 116) and the data and voice channels D and V. The protocol adapter 124 interfaces the Bluetooth and GSM protocol stacks 104, 106 to achieve the functionality of the present invention. In the sample embodiment described here, no additional hardware is needed in the mobile station 26, and only minute modifications of the existing Bluetooth and GSM protocol stacks 104, 106 are required. Thus the functionality of the present invention can be implemented with very little extra cost.

I claim:

1. A local station configurable for establishing a communication link between a telecommunications network and a mobile station, the local station comprising:
    a wireless network transceiver adapted for communication via a short range radio channel; and
    a controller operatively coupled to the telecommunications network and the wireless network transceiver, the controller being operative to: (a) contact the mobile station via the radio channel and negotiate at least one property of the radio channel; (b) receive a call indication from the telecommunications network and send an activation message to the mobile station via the radio channel, whereby the mobile station enters an active mode in response to receiving the activation message; and (c) link the mobile station to the telecommunications network via the radio channel using the at least one negotiated property.

2. The local station of claim 1, wherein the short range radio channel is a frequency hop, time division duplex (FH/TDD) channel.

3. The local station of claim 1, wherein the telecommunication network is a wire-based network.

4. The local station of claim 1, wherein the controller is further operative to receive a communication request from the mobile station in response to a user input and send an acknowledgment to the mobile station.

5. A method for establishing a communication link between a telecommunications network and a mobile station via a local station connected to said telecommunications network and a short range radio channel between said local station and said mobile station, said method comprising the steps of:
    a) said local station and said mobile station contacting each other via said radio channel and negotiating at least one property of said radio channel,
    b) said mobile station entering a power saving mode,
    c) said local station receiving a call indication from said telecommunications network and sending an activation message to said mobile station via said radio channel,
    d) said mobile station receiving said activation message and entering an active mode, and
    e) said local station linking said mobile station to said telecommunications network via said radio channel using said at least one negotiated property.

6. The method of claim 1,
    wherein step c) comprises the step of negotiating at least one of the following properties of said radio channel:
    transmission power level,
    voice transmission quality,
    voice transmission protocol,
    data transmission rate,
    data transmission protocol, and
    error correction and/or recovery method.

7. The method of claim 6,
    wherein step c) further comprises the step of negotiating at least one property of said local station and/or said mobile station.

8. The method of claim 5,
    wherein step c) further comprises the step of negotiating at least one property of said local station and/or said mobile station.

9. The method of claim 7, wherein step c) further comprises the step of negotiating one or more priorities of at least one of said local station and said mobile station with respect to incoming call indications.

10. The method of claim 8, wherein step c) further comprises the step of negotiating one or more priorities of at least one of said local station and said mobile station with respect to incoming call indications.

11. The method of any one of claims 5 to 8, further comprising the steps of:
    f) said mobile station sending a communication request to said local station in response to a user input,
    g) said local station receiving said communication request and sending an acknowledgement to said mobile station, and
    h) said local station linking said mobile station to said telecommunications network via said radio channel using said at least one negotiated property.

12. The method of claim 11,
    wherein said mobile station, in response to not receiving said acknowledgement from said local station within a predetermined time, uses a further radio channel for fulfilling said communication request.

13. The method of claim 12,
    wherein said further radio channel is at least one of a long range radio channel and a cellular radio channel.

14. The method of any one of claims 5 to 8,
    wherein said telecommunication network is a wire-based network.

15. The method of any one of claims 5 to 8,
    wherein said short range radio channel is a frequency hop, time division duplex (FH/TDD) channel.

16. A mobile station configurable for communication with a telecommunications network via a local station connected to the telecommunications network, the mobile station comprising:
    a wireless network transceiver adapted for communication via a short range radio channel; and
    a controller operatively coupled to the wireless network transceiver, the controller being operative to: (a) contact the local station via the radio channel and negotiate at least one property of the radio channel; (b) enter a power saving mode; (c) receive an activation message from the local station via the radio channel in response to a call indication received by the local station from the telecommunications network; (d) upon receiving the activation message, enter an active mode; and (e) link to the telecommunications network via the radio channel using the at least one negotiated property.

17. The mobile station of claim 9, wherein the controller is further operative to: (f) send a communication request to the local station in response to a user input; and (g) receive an acknowledgment from the local station in response to the local station receiving the communication request.

18. The mobile station of claim 17, wherein the controller, in response to not receiving the acknowledgment from the local station within a predetermined time, is operative to use a further radio channel for fulfilling the communication request.

19. The mobile station of claim 18, wherein said mobile station is a GSM handset comprising the wireless network transceiver, the GSM handset further comprising a GSM radio unit coupled to the controller for establishing at least one of a long range radio channel and a cellular radio channel.

20. The mobile station of claim 18, wherein said further channel is at least one of a long range radio channel and a cellular radio channel.

21. The mobile station of claim 20, wherein said mobile station is a GSM handset comprising the wireless network transceiver, the GSM handset further comprising a GSM radio unit coupled to the controller for establishing at least one of a long range radio channel and a cellular radio channel.

22. The mobile station of claim 16, wherein said mobile station is a GSM handset comprising the wireless network transceiver, the GSM handset further comprising a GSM radio unit coupled to the controller for establishing at least one of a long range radio channel and a cellular radio channel.

23. The mobile station of claim 16, wherein the short range radio channel is a frequency hop, time division duplex (fh/tdd) channel.

24. The mobile station of claim 23, wherein said mobile station is a GSM handset comprising the wireless network transceiver, the GSM handset further comprising a GSM radio unit -coupled to the controller for establishing at least one of a long range radio channel and a cellular radio channel.

25. The mobile station of claim 16, wherein the telecommunication network is a wire-based network.

26. The mobile station of claim 25, wherein said mobile station is a GSM handset comprising the wireless network transceiver, the GSM handset further comprising a GSM radio unit coupled to the controller for establishing at least one of a long range radio channel and a cellular radio channel.

* * * * *

UNITED STATES PATENT AND TRADEMARK OFFICE
CERTIFICATE OF CORRECTION

PATENT NO. : 6,571,103 B1
DATED : May 27, 2003
INVENTOR(S) : Emil P. Novakov

It is certified that error appears in the above-identified patent and that said Letters Patent is hereby corrected as shown below:

Column 10,
Line 1, delete "1" and insert -- 5 --.

Column 11,
Line 4, delete "9" and insert -- 16 --.

Signed and Sealed this

Thirtieth Day of September, 2003

JAMES E. ROGAN
*Director of the United States Patent and Trademark Office*